US012013810B2

(12) United States Patent
Chajdas

(10) Patent No.: US 12,013,810 B2
(45) Date of Patent: Jun. 18, 2024

(54) NON-HOMOGENEOUS CHIPLETS

(71) Applicant: ADVANCED MICRO DEVICES, INC., Santa Clara, CA (US)

(72) Inventor: Matthaeus G. Chajdas, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/956,013

(22) Filed: Sep. 29, 2022

(65) Prior Publication Data

US 2024/0111710 A1 Apr. 4, 2024

(51) Int. Cl.
*G06F 15/80* (2006.01)
*G06F 15/76* (2006.01)
*G06T 15/00* (2011.01)
(52) U.S. Cl.
CPC ............ *G06F 15/80* (2013.01); *G06T 15/005* (2013.01); *G06F 2015/765* (2013.01)

(58) Field of Classification Search
CPC .. G06T 15/005; G06F 15/80; G06F 2015/765
See application file for complete search history.

(56) References Cited

U.S. PATENT DOCUMENTS

2023/0305978 A1* 9/2023 Davis .................. G06F 13/4009
710/316

* cited by examiner

*Primary Examiner* — Zachary K Huson

(57) ABSTRACT

A semiconductor module comprises multiple non-homogeneous semiconductor dies disposed on the semiconductor module, with each semiconductor die having a set of circuitry modules that are common to all of the semiconductor dies and also a set of supporting circuitry modules that are distinct between the semiconductor dies. An interconnect communicatively couples the semiconductor dies together. Commands for processing by the semiconductor module may be routed to individual semiconductor dies based on capabilities of the particular circuitry modules disposed on those individual semiconductor dies.

18 Claims, 5 Drawing Sheets

NON-HOMOGENEOUS CHIPLETS

BACKGROUND

Computing devices such as mobile phones, personal digital assistants (PDAs), digital cameras, portable players, gaming, and other devices requires the integration of more performance and features into increasingly smaller spaces. As a result, the density of processor dies and number of dies integrated within a single integrated circuit (IC) package have increased. Some conventional multi-chip modules include two or more semiconductor chips mounted on a carrier substrate.

Conventional processing systems include processing units such as a central processing unit (CPU) and a graphics processing unit (GPU) that implement audio, video, and multimedia applications, as well as general purpose computing in some cases. The physical resources of a GPU include shader engines and fixed function hardware units that are used to implement user-defined reconfigurable virtual pipelines. For example, a conventional graphics pipeline for processing three-dimensional (3-D) graphics is formed of a sequence of fixed-function hardware block arrangements supported by programmable shaders.

A System-on-a-Chip (SoC) integrates multiple circuitry modules (nodes) of functionality in a single IC. For example, a SoC may include one or more processor cores, memory interfaces, network interfaces, optical interfaces, digital signal processors, graphics processors, telecommunications components, and the like. Traditionally, each of the nodes are created in a monolithic die.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
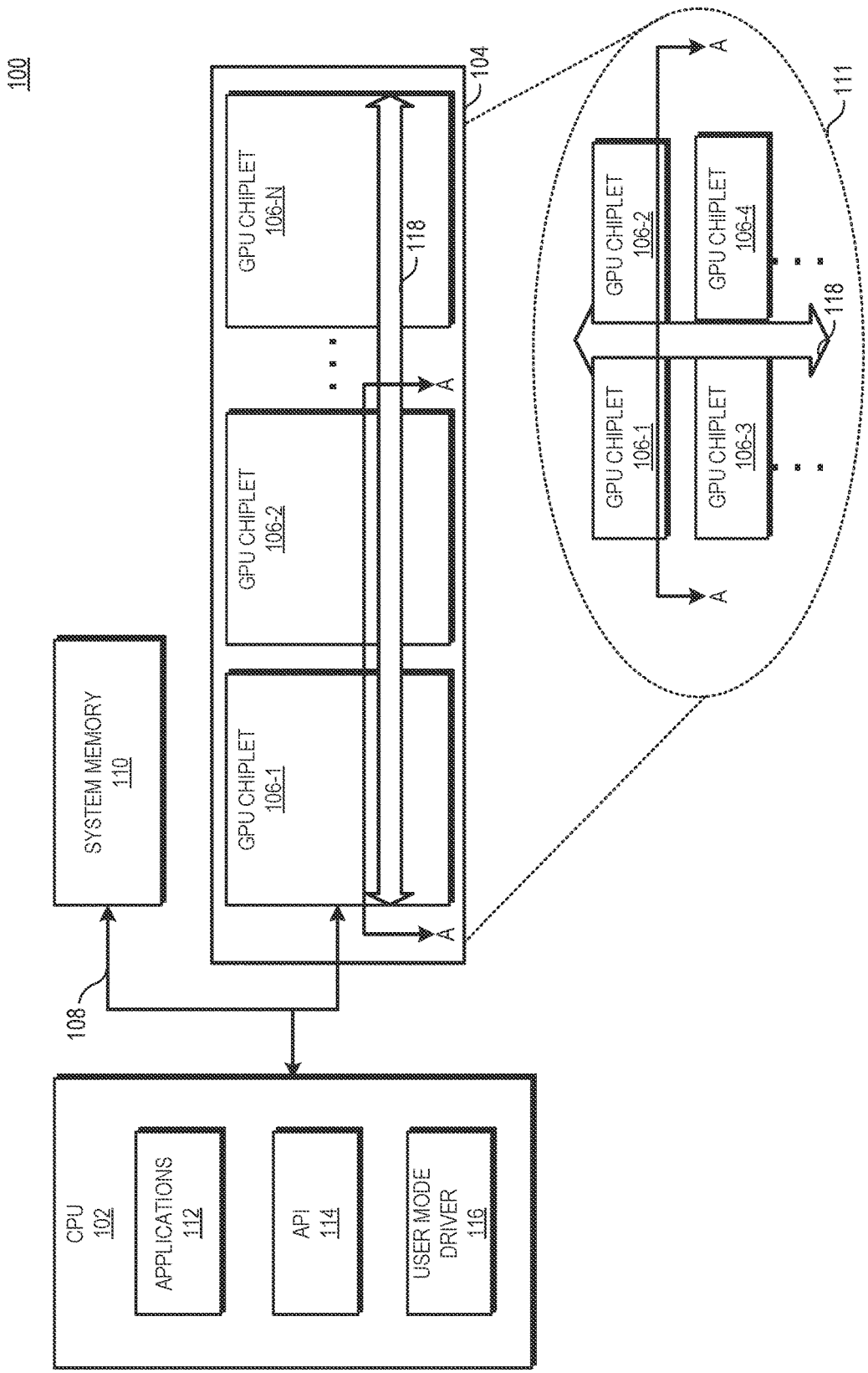
FIG. 1 is a block diagram illustrating a processing system employing multiple coupled GPU chiplets in accordance with some embodiments.

Conventional monolithic die designs are becoming increasingly expensive to manufacture as they grow in area to accommodate expanded functionality. To increase the yield of functional chips and reduce design complexity and cost, nodes are separated into highly connected but separate dies, termed chiplets. A chiplet is a semiconductor die containing one or more circuitry modules, such as a functional block or intellectual property (IP) block, that has been specifically designed to work with other chiplets to form larger, more complex chips. To modularize system design and reduce complexity, these chiplets often include reusable IP blocks. In various embodiments, and as used herein, a chiplet refers to a device that includes an active silicon die containing at least a portion of the computational logic used to solve a full problem (such that a computational workload is typically distributed across multiples of these active silicon dies). In various embodiments and configurations, multiple chiplets are packaged together as a monolithic unit on the same substrate and are typically invoked by a programming model that treats the combination of these separate computational dies (i.e., the chiplets) as a single monolithic unit (such that each chiplet is not exposed as a separate device to an application that uses the chiplets for processing computational workloads).

Chiplets have been used successfully in CPU architectures to reduce cost of manufacture and improve yields, as the heterogeneous computational nature of CPUs is more naturally suited to separate CPU cores into distinct units that do not require much inter-communication. In contrast, and as outlined elsewhere herein, GPU work by its nature includes parallel work. However, the geometry that a GPU processes includes not only sections of fully parallel work but also work that requires synchronous ordering between different sections. Accordingly, a GPU programming model that spreads sections of work across multiple GPUs tends to be inefficient, as it is difficult and expensive computationally to synchronize the memory contents of shared resources throughout the entire system to provide a coherent view of the memory to applications. Additionally, from a logical point of view, applications are written with the view that the system only has a single GPU. That is, even though a typical GPU includes many GPU cores, applications are programmed as addressing a single device. Although for at least these reasons it has been historically challenging to bring chiplet design methodology to GPU architectures, examples are discussed herein that include chiplets and circuitry modules specific to GPU operations. It will be appreciated that in various embodiments, chiplets and circuitry modules associated with performance of various other computational tasks may be used, either in conjunction with or in lieu of the particular chiplets and circuitry modules discussed herein.

FIGS. 1-5 illustrate techniques for partitioning a GPU into multiple chiplets, each including different heterogeneous components from each other such that the chiplets have complementary performance characteristics for processing different workloads. Embodiments of techniques described herein include a semiconductor module such as a graphics processing unit or other parallel processing unit having multiple semiconductor dies (chiplets), each connected via an interlink and each incorporating both a chiplet-wide common set of circuitry modules (e.g., memory interface modules, compute units, one or more levels and configurations of cache memory, etc., that are included on each semiconductor die) and a non-homogeneous set of supporting circuitry modules that varies between the multiple semiconductor dies. In various embodiments and configurations, such supporting circuitry modules include, as non-limiting examples: disparate cache memory configurations and structures; one or more accelerator circuitry modules (e.g., machine learning (ML) and/or artificial intelligence (AI) accelerator modules, ray tracing accelerator modules, etc.); shader engines; additional compute units; and the like.

Processing on a GPU is typically initiated by application programming interface (API) calls (e.g., draw calls) that are processed by a CPU. A draw call is a command that is generated by the CPU and transmitted to the GPU to instruct the GPU to render an object (or a portion of an object) in a frame. The draw call includes information defining textures, states, shaders, rendering objects, buffers, and the like that are used by the GPU to render the object or portion thereof. In response to receiving a draw call, the GPU renders the object to produce values of pixels that are provided to a display, which uses the pixel values to display an image that represents the rendered object. The object is represented by primitives such as triangles, patches, or other polygons that include multiple vertices connected by corresponding edges. An input assembler fetches the vertices based on topological information indicated in the draw call. The vertices are provided to a graphics pipeline for shading according to corresponding commands that are stored in a command buffer prior to execution by the GPU. The commands in the command buffer are written to a queue (or ring buffer) and a scheduler schedules the command buffer at the head of the queue for execution on the GPU.

The hardware used to implement the GPU is typically configured based on the characteristics of an expected workload. For example, if the workload processed by the GPU is expected to produce graphics at 8K resolution, the GPU processes up to eight primitives per clock cycle to guarantee a target quality of service and level of utilization. For another example, if the workload processed by the GPU is expected to produce graphics at a much lower 1080p resolution, the GPU guarantees a target quality of service and level of utilization when processing workloads at the lower 1080p resolution. Although conventional GPUs are optimized for a predetermined type of workload, many GPUs are required to process workloads that have varying degrees of complexity and output resolution. For example, a flexible cloud gaming architecture includes servers that implement sets of GPUs for concurrently executing a variety of games at different levels of user experience that potentially range from 1080p resolution all the way up to 8K resolution depending on the gaming application and the level of experience requested by the user. Although a lower-complexity or lower-resolution game can execute on a GPU that is optimized for higher complexity or resolution, a difference between the expected complexity or resolution of an optimized GPU and the actual complexity or resolution required by the application often leads to underutilization of the resources of the higher performance GPU. For example, serial dependencies between commands in a lower complexity/resolution game executing on a higher performance GPU reduce the amount of pixel shading that is performed in parallel, which results in underutilization of the resources of the GPU.

FIG. 1 is a block diagram illustrating a processing system 100 employing multiple coupled GPU chiplets in accordance with some embodiments. In the depicted example, the processing system 100 includes a central processing unit (CPU) 102 for executing instructions and a semiconductor module 104 that includes an array of GPU chiplets communicatively connected via an interconnect 118 (e.g., an active bridge chiplet). In the depicted embodiment, the array includes GPU chiplets 106-1, 106-2, and through 106-N (collectively, GPU chiplets 106) disposed on the semiconductor module 104.

In various embodiments, the CPU 102 is connected via a bus 108 to a system memory 110, such as a dynamic random access memory (DRAM). In various embodiments, the system memory 110 is implemented using other types of memory including static random access memory (SRAM), nonvolatile RAM, and the like. In the illustrated embodiment, the CPU 102 communicates with the system memory 110 and with the GPU chiplet 106-1 over bus 108, which in various embodiments is implemented as a peripheral component interconnect (PCI) bus, PCI-E bus, or other type of bus. However, some embodiments of the processing system 100 includes the GPU chiplet 106-1 communicating with the CPU 102 over a direct connection or via other buses, bridges, switches, routers, and the like.

As illustrated, the CPU 102 executes one or more application(s) 112 to generate graphic commands and a user mode driver 116 (or other drivers, such as a kernel mode driver). In various embodiments, the one or more applications 112 include applications that utilize the functionality of the GPU chiplets 106, such as applications that generate work in the processing system 100 or an operating system (OS). In some embodiments, an application 112 includes one or more graphics instructions that instruct the GPU chiplets 106 to render a graphical user interface (GUI) and/or a graphics scene. For example, in some embodiments the graphics instructions include instructions that define a set of one or more graphics primitives to be rendered by the GPU chiplets 106.

In some embodiments, the application 112 utilizes a graphics application programming interface (API) 114 to invoke a user mode driver 116 (or a similar GPU driver). User mode driver 116 issues one or more commands to the semiconductor module 104 (and thereby to GPU chiplets 106) for rendering one or more graphics primitives into displayable graphics images. Based on the graphics instructions issued by application 112 to the user mode driver 116, the user mode driver 116 formulates one or more graphics commands that specify one or more operations for the GPU chiplets 106 to perform for rendering graphics. In some embodiments, the user mode driver 116 is a part of the application 112 running on the CPU 102. For example, in some embodiments the user mode driver 116 is part of a gaming application running on the CPU 102. Similarly, in some embodiments a kernel mode driver (not shown) is part of an operating system running on the CPU 102.

In the depicted embodiment of FIG. 1, an interconnect 118 (such as an active bridge chiplet) communicatively couples the GPU chiplets 106 (i.e., GPU chiplets 106-1 through 106-N) to each other. Although three GPU chiplets 106 are shown in FIG. 1, the number N of chiplets disposed on the semiconductor module 104 varies in other embodiments. In certain embodiments, the interconnect 118 comprises an active silicon bridge that serves as a high-bandwidth die-to-die interconnect between chiplet dies. Additionally, the interconnect 118 operates in certain embodiments as a memory crossbar with a shared, unified last level cache (LLC) to provide inter-chiplet communications and to route cross-chiplet synchronization signals.

As a general operational overview, the CPU 102 is communicatively coupled to a single chiplet (i.e., GPU chiplet 106-1) through the bus 108. CPU-to-GPU transactions or communications from the CPU 102 to the semiconductor module 104 and GPU chiplets 106 is received at the GPU chiplet 106-1. Subsequently, any inter-chiplet communications (such as one or more commands being routed to one of GPU chiplets 106 for processing) are routed through the interconnect 118 as appropriate to access memory channels on other GPU chiplets 106. In this manner, the chiplet-based processing system 100 includes GPU chiplets 106 that are addressable as a single, monolithic GPU from a software developer's perspective (e.g., the CPU 102 and any associated applications/drivers are unaware of the chiplet-based architecture), and therefore avoids requiring any chiplet-specific considerations on the part of a programmer or developer.

It will be appreciated that in different embodiments the GPU chiplets 106 are placed in different arrangements so that the interconnect 118 supports more than two GPU chiplets. An example is illustrated at FIG. 1 as layout 111. In particular, layout 111 illustrates a top down view of an arrangement of the interconnect 118 communicatively coupling four or more GPU chiplets 106 in accordance with some embodiments. In the depicted example of layout 111, GPU chiplets 106 are arranged in pairs, to form two "columns" of GPU chiplets with the interconnect 118 placed between the columns. Thus, GPU chiplet 106-2 is placed lateral to GPU chiplet 106-1, GPU 106-3 is placed below the GPU chiplet 106-1, and GPU 106-4 is placed lateral to GPU chiplet 106-3 and below GPU chiplet 106-4. The interconnect 118 is placed between the lateral pairs of GPU chiplets.

Figure 2:
FIG. 2 is a block diagram illustrating a group of GPU chiplets disposed on a semiconductor module.

FIG. 2 is a block diagram illustrating the group of GPU chiplets 106 disposed on semiconductor module 104 and coupled by interconnect 118 in accordance with some embodiments. The figure provides a hierarchical view of GPU chiplets 106-1 and 106-2, each of which is substantially identical. Each of the GPU chiplets 106-1, 106-2 comprises a variety of circuitry modules, including a plurality of compute units 202 (CU) and a plurality of fixed function blocks 204 (GFX) that communicate with a given channel's L1 cache memory 206. The circuitry modules of each chiplet 106 also include a plurality of individually accessible banks of L2 cache memory 208 and a plurality of memory interface channels (memory PHY 212) that are mapped to the L3 cache channels. In the depicted embodiment, the L2 level of cache is coherent within a single chiplet and the L3 level (L3 cache memory 210 or other last level) of cache is unified and coherent across all of the GPU chiplets 106. In certain embodiments, the interconnect 118 comprises an active bridge chiplet that includes an additional unified cache (not shown) on a separate semiconductor die than the GPU chiplets 106, and that provides an external unified memory interface to communicatively link two or more GPU chiplets 106 together. The semiconductor module 104 therefore acts as a monolithic silicon die starting from the register transfer level (RTL) perspective and provides fully coherent memory access.

A graphics data fabric (GDF) 214 of each GPU chiplet 106 connects all of the L1 cache memories 206 to each of the channels of the L2 cache memory 208, thereby allowing each of the compute units 202 and fixed function blocks 204 to access data stored in any bank of the L2 cache memory 208.

Portions of the GPU used for traditional graphics and compute (i.e., the graphics core) are differentiable from other portions of the GPU used for handling auxiliary GPU functionality such as video decode, display output, and various system supporting structures that are contained on the same die. In various embodiments, the graphics core (GC) of the GPU includes CUs, fixed function graphics blocks, caches above L3 in the cache hierarchy, and the like. In the depicted embodiment, each GPU chiplet 106 also includes a scalable data fabric 216 (SDF) (also known as a SOC memory fabric) that routes across the graphics core (GC) and system on chip (SOC) IP cores to the interconnect 118. The interconnect 118 routes to all of the GPU chiplets (e.g., GPU chiplets 106-1 and 106-2 in FIG. 2) via the banks of L3 cache memory 210. In certain embodiments, the interconnect 118 may be referred to as a bridge chiplet, active bridge die, or active silicon bridge.

Figure 3:
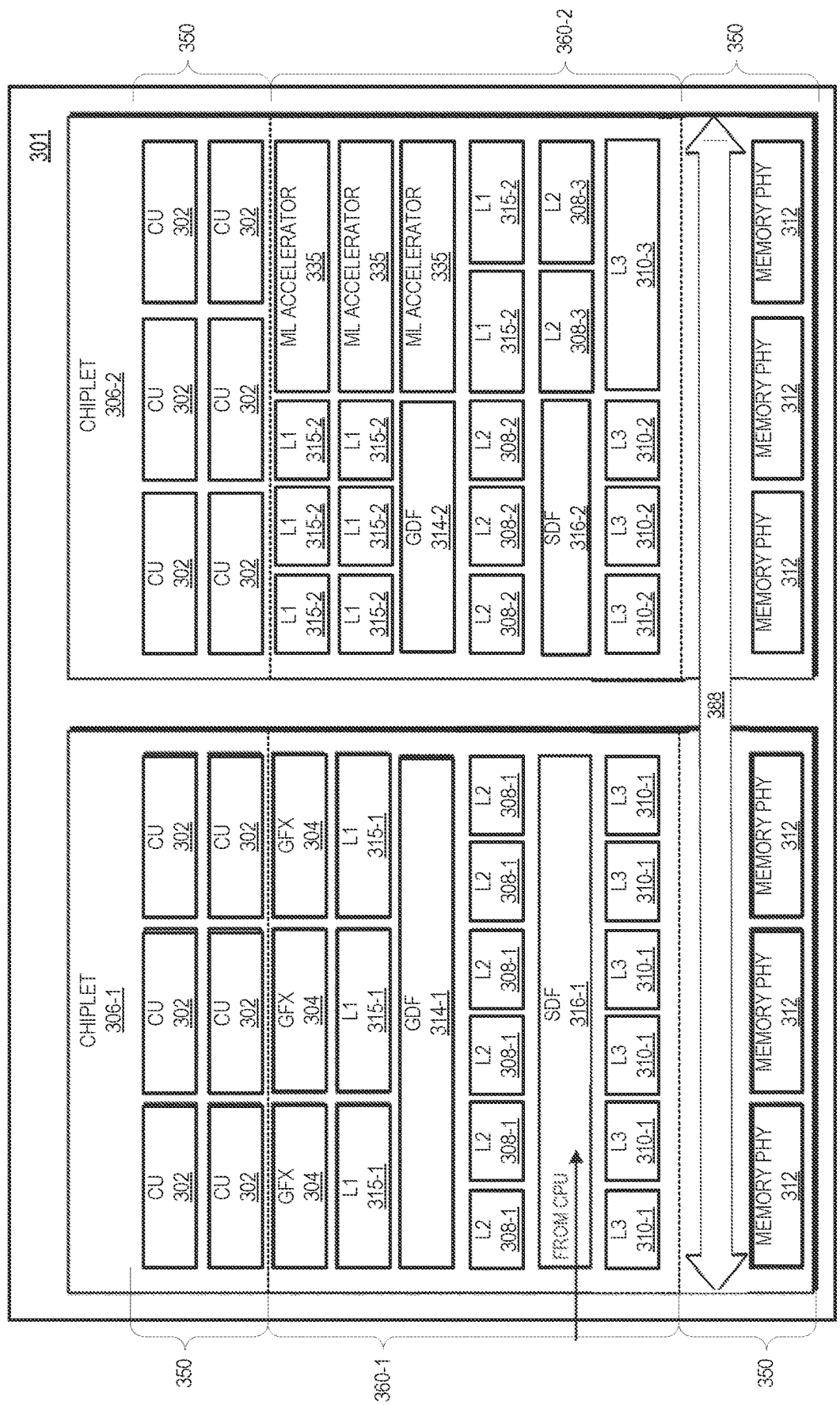
FIG. 3 is a block diagram illustrating a group of non-homogeneous GPU chiplets disposed on a semiconductor module in accordance with some embodiments.

FIG. 3 is a block diagram illustrating a group of GPU chiplets 306-1 and 306-2 (collectively referenced as GPU chiplets 306) disposed on a semiconductor module 301 and coupled by an interconnect 388 in accordance with some embodiments. The figure provides a hierarchical view of GPU chiplets 306-1 and 306-2, each of which comprises a variety of circuitry modules. However, in contrast to the GPU chiplets 106 of semiconductor module 104, GPU chiplets 306 are not identical. Instead, each of the GPU chiplets 306-1 and 306-2 include a common set of circuitry modules 350 and also include a non-homogeneous set of supporting circuitry modules 360. It will be appreciated that in the embodiment depicted in FIG. 3 and the corresponding discussion below, the particular layout and composition of the circuitry modules disposed on each of GPU chiplets 306 is only exemplary, and that in various embodiments, multiple alternative layouts and compositions may be utilized in accordance with techniques described herein.

In the depicted embodiment, each of the GPU chiplets 306 includes a plurality of compute units 302 (CU) and a plurality of memory interface channels (memory PHY 312) as the common set of circuitry modules 350. GPU chiplet 306-1 further includes a set of supporting circuitry modules 360-1 that comprises a plurality of fixed function blocks 304 (GFX); multiple banks of L1 cache memory 315-1; multiple banks of L2 cache memory 308-1; multiple banks of L3 cache memory 310-1; a graphics data fabric 314-1 (GDF); and a scalable data fabric 316-1 (SDF), all of which perform operations substantially identical to those of the corresponding components discussed with respect to GPU chiplet 106-1 of FIG. 2.

In contrast, GPU chiplet 306-2 includes a set of supporting circuitry modules 360-2 that is distinct from the set of supporting circuitry modules 360-1 of the GPU chiplet 306-1. In particular, the set of supporting circuitry modules 360-2 includes multiple banks of L1 memory 315-2, which in the depicted embodiment are sized and/or configured differently than the corresponding banks of L1 memory 315-1 of GPU chiplet 306-1; a GDF 314-2, which may similarly be sized and/or configured differently (e.g., different associativity, different cache policies, etc.) than the corresponding GDF 314-1; an SDF 316-2, which may similarly be sized and/or configured differently than the corresponding SDF 316-1; multiple banks of L2 memory 308-2 and 308-3; multiple banks of L3 memory 310-2 and 310-3; and machine learning accelerators 335. Each of the memory banks disposed on GPU chiplet 306-2 (e.g., L1 memory 315-1, L2 memory 308-2 and 308-3, and L3 memory 310-2 and 310-3) is sized and/or configured differently than the corresponding such memory banks disposed on GPU chiplet 306-1, such as to size and/or configure the memory banks disposed on GPU chiplet 306-2 for one or more specific operations of the set of supporting circuitry modules 360-2.

In addition to each set of supporting circuitry modules of the GPU chiplets 306 supporting a non-homogeneous set of operations, in certain embodiments each set of supporting circuitry modules of a particular GPU chiplet is associated with a disparate set of design parameters. For example, and as described above, each GPU chiplet 306 includes one or more banks of some level(s) of cache memory as part of its respective set of supporting circuitry modules 360, with the size and/or configuration of those memory banks varying between the GPU chiplets 306. As another example, a register file size associated with GPU chiplet 306-1 may be different than a register file size associated with GPU chiplet 306-2.

The inclusion of a particular type of circuitry module within the common set of circuitry modules 350 does not exclude that type of circuitry module from being disposed as part of an individual chiplet's set of supporting circuitry modules. For example, while not depicted in the embodiment of FIG. 3, in certain embodiments a set of supporting circuitry modules for an individual GPU chiplet includes one or more compute units in addition to those disposed as part of the common set of circuitry modules 350. Thus, for each individual GPU chiplet 306, separate instances of various types of circuitry modules (e.g., compute units, cache memories, shader engines, fixed function blocks, and various types of accelerators) may be disposed as part of a common set of circuitry modules, as part of a set of supporting circuitry modules specific to one or more individual GPU chiplets, or both.

Figure 4:
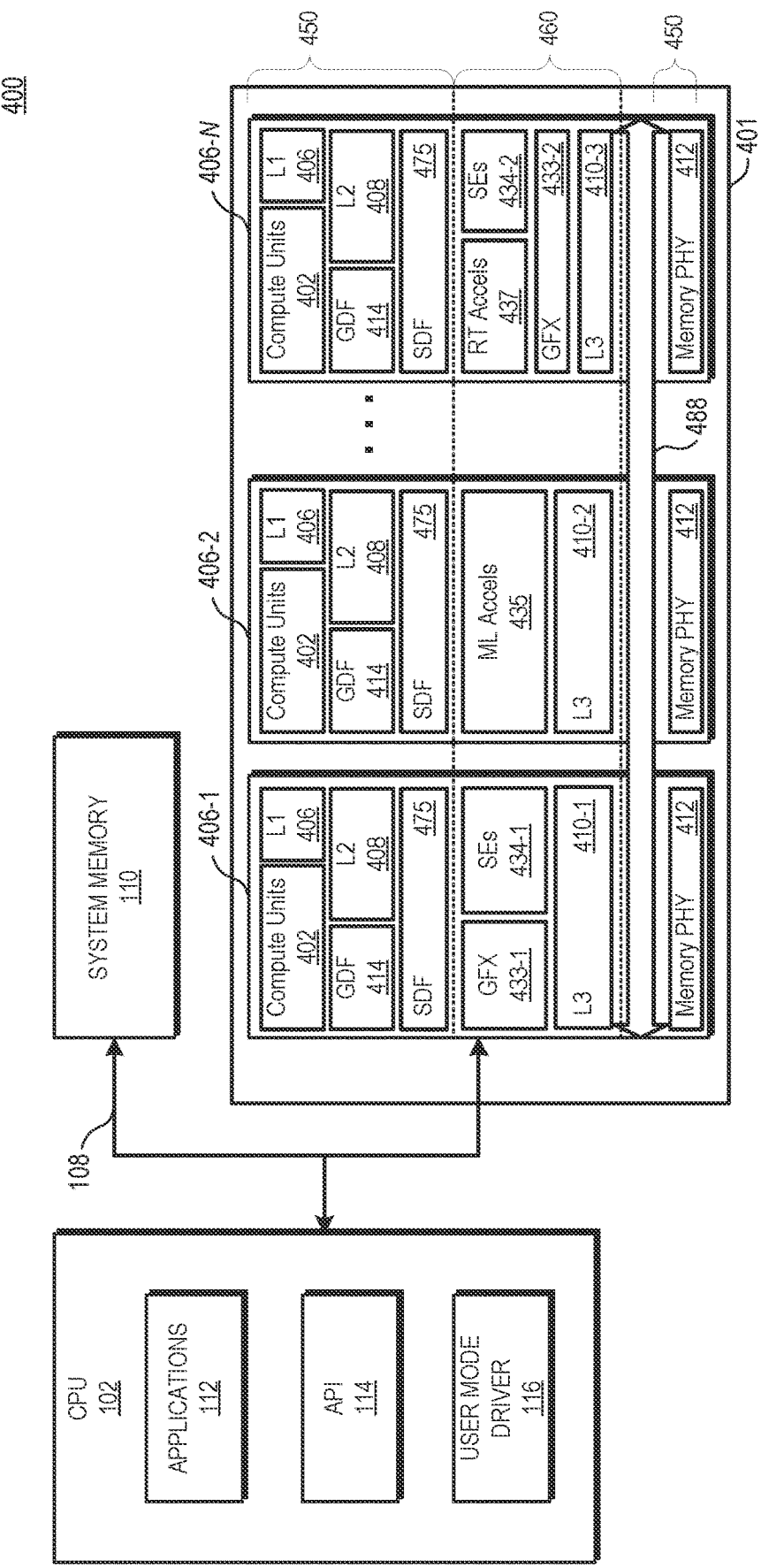
FIG. 4 is a block diagram illustrating a group of non-homogeneous GPU chiplets disposed on a semiconductor module in accordance with some embodiments.

FIG. 4 is a block diagram illustrating a processing system 400, which in a manner similar to that described with respect to processing system 100 of FIG. 1, employs multiple coupled GPU chiplets disposed on a single semiconductor module in accordance with some embodiments. In the depicted example, the processing system 400 includes the central processing unit (CPU) 102 for executing instructions, now communicatively coupled to a semiconductor module 401 that includes an array of GPU chiplets that are connected via an interconnect 488 (e.g., an active bridge chiplet or other suitable interconnect). In the depicted embodiment, the array includes GPU chiplets 406-1, 406-2, and through 406-N (collectively, GPU chiplets 406) disposed on the semiconductor module 401.

In contrast with semiconductor module 104 of processing system 100, the GPU chiplets 406 disposed on semiconductor module 401 of the processing system 400 comprise non-homogeneous GPU chiplets, each of which includes a common set of circuitry modules 450 and also a disparate set of supporting circuitry modules 460. As similarly noted with respect to semiconductor module 301 of FIG. 3, the particular layout and composition of the circuitry modules disposed on each of GPU chiplets 406 is only exemplary, such that in various embodiments, multiple alternative layouts and compositions may be utilized in accordance with techniques described herein.

In the depicted embodiment, the common set of circuitry modules 450 disposed on each of the GPU chiplets 406 includes compute units 402, one or more banks of L1 cache memory 406, GDF 414, SDF 475, one or more banks of L2 cache memory 408, and memory interface circuitry (memory PHY) 412.

Each of the GPU chiplets 406 further includes a disparate set of supporting circuitry modules 460. In particular, the set of supporting circuitry modules 460 disposed on GPU chiplet 406-1 includes fixed function blocks (GFX) 433-1, shader engines 434-1, and one or more banks of L3 cache memory 410-1. The set of supporting circuitry modules 460 disposed on GPU chiplet 406-2 includes machine learning accelerators 435 and one or more banks of L3 cache memory 410-2 (which may be sized and/or configured differently than the corresponding banks of L3 cache memory 410-1 disposed on GPU chiplet 406-1). The set of supporting circuitry modules 460 disposed on GPU chiplet 406-N includes ray tracing accelerators 437, shader engines 434-2, fixed function blocks (GFX) 433-2, and one or more banks of L3 cache memory 410-3 (which again may be sized and/or configured differently than the corresponding banks of L3 cache memory 410-1 disposed on GPU chiplet 406-1 or L3 cache memory 410-2 disposed on GPU chiplet 406-2).

As a general operational overview, the CPU 102 is communicatively coupled to a single chiplet (i.e., GPU chiplet 106-1) through the bus 108. CPU-to-GPU transactions or communications from the CPU 102 to the semiconductor module 104 and GPU chiplets 106 is received at the GPU chiplet 106-1. Subsequently, any inter-chiplet communications (such as one or more commands being routed to one of GPU chiplets 106 for processing) are routed through the interconnect 118 as appropriate to access memory channels on other GPU chiplets 106. However, in certain embodiments the CPU 102 routes various commands (such as those generated by applications 112 and routed via the user mode driver 116) to different individual GPU chiplets 406 disposed on the semiconductor module 401 in accordance with (and based upon) the specific set of supporting circuitry modules 460 associated with each GPU chiplet. For example, in the embodiment of FIG. 4, the CPU 102 routes commands associated with machine learning to those particular GPU chiplets (e.g., GPU chiplet 406-2) that include machine learning accelerator circuitry modules, routes commands associated with general rendering to those GPU chiplets (e.g., GPU chiplet 406-1) that include a balance of fixed function blocks and shader engines, and routes commands associated with ray trace rendering to those GPU chiplets (e.g., GPU chiplet 406-N) that include one or more ray tracing accelerators. Alternatively, a scheduler on the GPU package itself can route a command to the appropriate chiplet(s), optionally splitting up commands into multiple commands to execute on different blocks if necessary. Multiple GPU schedulers can cooperate to distribute the work.

Figure 5:
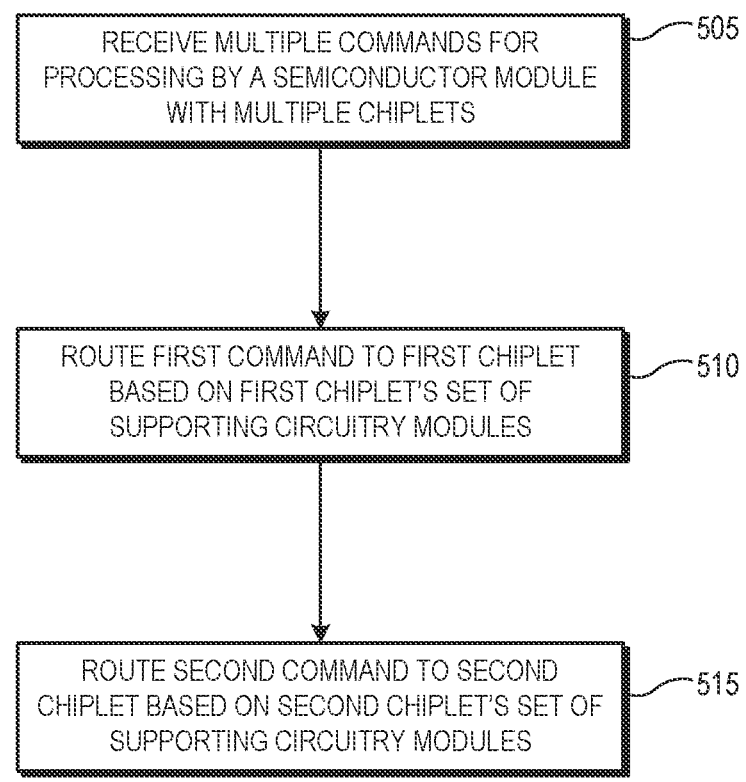
FIG. 5 presents an operational routine for use with a semiconductor module having multiple non-homogeneous chiplets in accordance with some embodiments.

FIG. 5 presents an operational routine 500 for use with a semiconductor module having multiple non-homogeneous chiplets (e.g., semiconductor module 301 of FIG. 3 and/or semiconductor module 401 of FIG. 4). The operational routine may be performed, for example, by one or more processors (e.g., CPU 102 of FIGS. 1 and 4) routing commands (e.g., draw commands or other commands, routed via a user mode driver or other driver) to the semiconductor module for processing.

The routine begins at block 505, in which the one or more processors receive multiple commands for processing by a semiconductor module that comprises multiple non-homogeneous chiplets disposed on the semiconductor module.

At block 510, the one or more processors route a first command to a first chiplet disposed on the semiconductor module based on the first chiplet's set of supporting circuitry modules.

At block 515, the one or more processors route a second command to a second chiplet disposed on the semiconductor module based on the second chiplet's set of supporting circuitry modules.

It will be appreciated that although the operational routine depicted in FIG. 5 describes the routing of only two commands to disparate chiplets based on their respective set of supporting circuitry modules, in operation each of a large plurality of such commands is routed to individual non-homogeneous chiplets disposed on a semiconductor module in accordance with the techniques described herein. For example, in certain embodiments, the commands from the CPU may be routed to a command processor of the GPU which may determine a destination (e.g., a GPU chiplet with an appropriate set of supporting circuitry modules, a GPU scheduler, etc.) for processing each command.

In some embodiments, the apparatus and techniques described above are implemented in a system including one or more integrated circuit (IC) devices (also referred to as integrated circuit packages or microchips), such as the semiconductor modules and semiconductor dies described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A parallel processing unit comprising:
    a first semiconductor die with a common set of circuitry modules and a first set of supporting circuitry modules, wherein the first set of supporting circuitry modules comprises a first cache having a first cache configuration;
    a second semiconductor die with the common set of circuitry modules and a second set of supporting circuitry modules that is different than the first set of supporting circuitry modules, wherein the second set of supporting circuitry modules comprises a second cache having a second cache configuration that is different from the first cache configuration; and
    an interconnect connecting the first semiconductor die and the second semiconductor die.

2. The parallel processing unit of claim 1 wherein the second set of supporting circuitry modules includes one or more machine learning accelerator circuitry modules.

3. The parallel processing unit of claim 1 wherein the second set of supporting circuitry modules includes one or more ray tracing accelerator circuitry modules.

4. The parallel processing unit of claim 1 wherein the common set of circuitry modules includes at least one shader engine, and wherein the second set of supporting circuitry modules includes one or more additional shader engines.

5. The parallel processing unit of claim 1 wherein the common set of circuitry modules includes at least one compute unit, and wherein the second set of supporting circuitry modules includes one or more additional compute units.

6. The parallel processing unit of claim 1 wherein the first set of supporting circuitry modules is associated with a first set of design parameters, and wherein the second set of supporting circuitry modules is associated with a second set of design parameters.

7. The parallel processing unit of claim 6 wherein the design parameters include at least one of a group that includes a cache size and a register file size.

8. The parallel processing unit of claim 1 wherein the common set of circuitry modules includes one or more memory interface circuitry modules.

9. The parallel processing unit of claim 1, further comprising:
    one or more additional semiconductor dies, each additional semiconductor die having the common set of circuitry modules and a respective additional set of supporting circuitry modules.

10. A method comprising:
receiving an indication of multiple commands for processing at a parallel processing unit;
routing a first command of the multiple commands to a first semiconductor die disposed on the parallel processing unit, the first semiconductor die comprising a common set of circuitry modules and a first set of supporting circuitry modules, the first set of supporting circuitry modules comprising a first cache having a first cache configuration; and
routing a second command of the multiple commands to a second semiconductor die disposed on the parallel processing unit, the second semiconductor die comprising the common set of circuitry modules and a second set of supporting circuitry modules that is different than the first set of supporting circuitry modules, the second set of supporting circuitry modules comprising a second cache having a second cache configuration that is different from the first cache configuration.

11. The method of claim 10 wherein the second set of supporting circuitry modules includes one or more machine learning accelerator circuitry modules.

12. The method of claim 10 wherein the second set of supporting circuitry modules includes one or more ray tracing accelerator circuitry modules.

13. The method of claim 10 wherein the common set of circuitry modules includes at least one shader engine, and wherein the second set of supporting circuitry modules includes one or more additional shader engines.

14. The method of claim 10 wherein the common set of circuitry modules includes at least one compute unit, and wherein the second set of supporting circuitry modules includes one or more additional compute units.

15. The method of claim 10 wherein the first set of supporting circuitry modules is associated with a first set of design parameters, and wherein the second set of supporting circuitry modules is associated with a second set of design parameters that includes at least one of a group that includes a cache size and a register file size.

16. The method of claim 10 wherein the common set of circuitry modules includes one or more memory interface circuitry modules.

17. The method of claim 10, further comprising:
routing each of one or more additional commands to one or more additional semiconductor dies on the parallel processing unit, each additional semiconductor die having the common set of circuitry modules and a respective additional set of supporting circuitry modules.

18. A device, comprising:
a first semiconductor die comprising a first set of supporting circuitry modules, wherein the first set of supporting circuitry modules includes a first cache having a first cache configuration;
a second semiconductor die comprising a second set of supporting circuitry modules that is different than the first set of supporting circuitry modules, wherein the second set of supporting circuitry modules comprises a second cache having a second cache configuration that is different from the first cache configuration; and
an interconnect connecting the first semiconductor die and the second semiconductor die;
wherein the first semiconductor die and the second semiconductor die are addressable as a single parallel processing unit.

* * * * *